Patented June 11, 1935

2,004,728

UNITED STATES PATENT OFFICE 2,004,728

HYDROXY ARYL MERCAPTO COMPOUNDS AND PROCESSES FOR PREPARING THE SAME

Keith William Palmer, Blackley, Manchester, England, assignor to Imperial Chemical Industries Limited, a corporation of Great Britain No Drawing. Application July 23, 1932, Serial No. 624,354. In Great Britain July 31, 1931

22 Claims. (Cl. 260—154)

The present invention relates to the preparation of aryl mercapto compounds and more particularly to the preparation of hydroxy aryl mercapto compounds.

Haitinger (Monatshefte, vol. 4, page 166) has described the production of monothio catechol by fusing sodium phenoxide and sulfur, one molecule of sodium phenoxide apparently being converted into the disodium salt of monothiocatechol, while one molecule was converted into free phenol. Employing other proportions of sulfur and the like, other workers have obtained other products from different phenols, see for example Lange, Berichte, vol. 21, 260. Up to the present time, however, no one has been able to obtain satisfactory conversion into mercapto derivatives.

An object of the present invention is to provide an improved process for preparing mercapto derivatives of hydroxy aryl compounds. A further object is to provide such a process whereby much greater yields are obtained in a more efficient and economical manner. A still further object is to provide new mercapto compounds. Other objects are to provide new compositions of matter and to advance the art. Still other objects will appear hereinafter.

These objects may be accomplished according to my invention which comprises reacting an alkali metal aryl oxide with an alkali metal disulfide at elevated temperatures.

My invention is based upon the discovery that, when an alkali salt of a hydroxy aryl compound, containing at least one free orth- or para-position, is heated with an alkali disulfide, a mercapto group is introduced into the aryl ring or nucleus and a hydroxyl aryl mercapto compound is obtained. The reaction taking place appears to be that represented by the following equation which shows the probable change taking place when sodium phenoxide is treated in accordance with the invention:

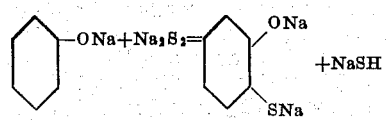
+NaSH

The process of the present invention may be satisfactorily accomplished by first preparing the alkali metal salt of the hydroxy aryl compound and then reacting such salt with the alkali metal disulfide. However, I have found that it is not necessary to prepare the alkali salt separately but preferably may convert the hydroxy aryl compound directly to its mercapto derivative in a single simplified step by heating the hydroxy aryl compound with an alkali metal disulfide and caustic alkali in the appropriate proportions. During such preferred procedure, the alkali salt is probably formed first and then such salt reacts with the alkali metal disulfide. While, in accordance with the above equation, equi-molecular proportions of the various ingredients should theoretically be employed, a small excess of one or more of the various ingredients may be employed having due regard to the requirements of technical practice. If it is desired to introduce more than one mercapto group into the aryl ring or nucleus, a corresponding increase in the molecular proportion of the alkali metal disulfide may be employed with satisfactory results; that is, where it is desired to introduce, for example, two mercapto groups into the aryl nucleus, two moles of the alkali metal disulfide to each mole of the hydroxy aryl compound may be employed.

Mercapto derivatives of hydroxy aryl compounds are well known to be readily oxidizable to the corresponding disulfides by the action of atmospheric oxygen, during the preparation of the mercapto derivative. I have found that this tendency toward the production of disulfides in my process can be largely inhibited or suppressed by causing the reaction to take place in the presence of an alkali metal sulfide.

In order to more clearly illustrate my invention and the preferred mode in which I contemplate carrying the same into effect the following examples are given:

EXAMPLE 1

Monothiocatechol from phenol 270 parts of sodium sulfide crystals (9H$_2$O) are melted on the steam bath and 32 parts of sulfur are added, the mixture being stirred until the sulfur dissolves. 40 parts of flake caustic soda are now added. When the caustic has dissolved, 94 parts of phenol are added to the solution. The mixture is now heated in an oil bath under a short air-condenser to 170–180° C. for 17 hours. The melt is then dissolved in water. Hydrochloric acid is added until the solution just shows mineral acidity when monothiocatechol, as a greenish oil, is thrown out of solution. This is separated, conveniently by solvent extraction, and distilled under diminished pressure, if desired.

Instead of 94 parts of phenol, 106 parts of o-cresol may be employed thereby obtaining the corresponding mercapto-o-cresol.

EXAMPLE 2

1-mercapto-2-naphthol from b-naphthol 270 parts of sodium sulfide crystals (9H$_2$O), 16 parts of sulfur, 20 parts of flake caustic soda, and 72 parts of b-naphthol are mixed together as in Example 1. As will be seen, these proportions are such that for each molecular proportion of sodium b-naphthoxide there is a molecular proportion of sodium disulfide, and a molecular proportion of sodium sulfide. This amount of sodium sulfide is added to inhibit the production 2,2'-dihydroxy-di-naphthyldisulfide. The mixture is heated at 170–180° C. for one hour. The melt is dissolved in water and the solution is rendered just mineral acid to Congo-red paper by adding hydrochloric acid. The yellow precipitate, which is formed, consists of a mixture of 1-mercapto-2-naphthol and the corresponding disulfide. The precipitate is filtered off, washed, treated with hot glacial acetic acid (800 parts), zinc dust (80 parts), and enough hydrochloric acid added in portions to keep up mineral acidity until a colorless solution is obtained. The colorless solution is poured into about 1500 parts of a mixture of ice and water, and the pure 1-mercapto-2-naphthol (M. P. 56–60°) filtered off and washed.

EXAMPLE 3 a-naphthol is employed instead of b-naphthol as in Example 2. The time of heating is 20 hours. The product of the heating is likewise a mixture and is treated as described in Example 2 to give a new mercapto-1-naphthol which has a melting point of about 15° C. and gives a disulfide of M. P. 147–148°, on oxidation.

EXAMPLE 4

540 parts of sodium sulfide crystals (9H$_2$O) are melted and 64 parts of sulfur are added, the mixture being stirred until the sulfur dissolves. 40 parts of flake caustic soda and 94 parts of phenol are added and the mixture heated at 170–180° as described in Example 1. The melt is dissolved in water and the solution is acidified. The new product, apparently a dimercaptophenol, is obtained as a viscous greenish oil.

While, in the above examples, I have disclosed the use of sodium disulfide, caustic soda, and sodium sulfide, the disulfide, sulfide and hydroxide of the other alkali metals may be employed, if so desired. Further, other non-oxidizing acids than hydrochloric may be employed for acidifying the reaction products.

In the examples, I have disclosed derivatives obtained from phenol, o-cresol, alpha and beta naphthol. However, my process is of general application for the preparation of mercapto derivatives of hydroxy aryl compounds which have at least one free ortho- or para-position and which may contain more than one hydroxy group, and other groups substituted in the ring.

While I have described a process employing certain ingredients in specific amounts and under specific conditions, it will be readily understood, by those skilled in the art, that various modifications and changes in the ingredients, proportions and conditions may be made without departing from the spirit of my invention. Accordingly, the scope of my invention is to be limited solely by the appended claims construed as broadly as is permissible in view of the prior art.

I claim:

1. A process for the manufacture of mercaptophenols which comprises heating an alkali metal phenoxide having at least one free ortho or para position with an alkali metal disulfide.

2. A process as claimed in claim 1 wherein, prior to the heating, the alkali metal phenoxide having at least one free ortho or para position is made by interaction of the phenol and caustic alkali in presence of the other ingredients.

3. In the process of preparing a hydroxy aryl mercapto compound, the step which comprises reacting an alkali metal salt of a phenol having at least one free ortho or para position with an alkali metal disulfide.

4. In the process of preparing a hydroxy aryl mercapto compound, the step which comprises reacting a phenol having at least one free ortho or para position with caustic alkali and an alkali metal disulfide.

5. In the process of preparing a hydroxy phenyl mercapto compound, the step which comprises reacting an alkali metal salt of phenol with an alkali metal disulfide.

6. In the process of preparing a hydroxy phenyl mercapto compound the step which comprises reacting a phenol of the benzene series having at least one free ortho or para position with caustic alkali and an alkali metal disulfide.

7. In the process of preparing a mercapto phenol, the step which comprises reacting an alkali metal phenoxide having at least one free ortho or para position with an alkali metal disulfide.

8. In the process of preparing a mercapto phenol the step which comprises reacting phenol with a caustic alkali and one molecular proportion of an alkali metal disulfide.

9. In the process of preparing a hydroxy naphthyl mercapto compound, the step which comprises reacting an alkali metal salt of a naphthol having at least one free ortho or para position with an alkali metal disulfide.

10. In the process of preparing a hydroxy naphthyl mercapto compound the step which comprises reacting a naphthol having at least one free ortho or para position with caustic alkali and an alkali metal disulfide.

11. In the process of preparing a mercapto naphthol, the step which comprises reacting an alkali metal naphthoxide having at least one free ortho or para position with an alkali metal disulfide.

12. In the process of preparing a mercapto naphthol, the step which comprises reacting a mono-hydroxy naphthelene having at least one free ortho or para position with a caustic alkali and an alkali metal disulfide.

13. In the process of preparing a hydroxy aryl mercapto compound, the step which comprises reacting one molecular proportion of a phenol having at least one free ortho or para position with at least two molecular proportions of an alkali metal disulfide and a caustic alkali.

14. The process of preparing a hydroxyl aryl mercapto compound which comprises heating a phenol having at least one free ortho or para position with caustic alkali and an alkali metal disulfide at superatmospheric temperatures until reaction is complete, dissolving the reaction products in water, acidifying the solution and separting the resulting hydroxy aryl mercapto compound.

15. The process of preparing a hydroxy naphthyl mercapto compound which comprises heating a naphthol having at least one free ortho or para position with caustic alkali and an alkali metal disulfide at superatmospheric temperatures until reaction is complete, dissolving the reaction products in water, acidifying the solution, separating the solids from the acidified solution, reducing the solids in hot glacial acetic acid, and then separating the hydroxy naphthyl mercapto compound from the resulting solution.

16. The process of preparing a hydroxy naphthyl mercapto compound which comprises heating a naphthol having at least one free ortho or para position with caustic alkali, an alkali metal sulfide, and an alkali metal disulfide at superatmospheric temperatures until reaction is complete, dissolving the reaction products in water, acidifying the solution, separating the solids from the acidified solution, reducing the solids in hot glacial acetic acid, and then separating the hydroxy naphthyl mercapto compound from the resulting solution.

17. An aryl compound having at least one member of the group consisting of hydroxy and alkali metal oxy groups directly connected to nuclear carbon atoms and at least two similar members of the group consisting of mercaptan and alkali metal mercaptide groups directly connected to nuclear carbon atoms.

18. In the process of preparing a hydroxy aryl mercapto compound, the step which comprises reacting an alkali metal salt of a phenol having at least one free ortho or para position with an alkali metal disulfide in the presence of an alkali metal sulfide.

19. In the process of preparing a hydroxy aryl mercapto compound, the step which comprises reacting a phenol having at least one free or ortho or para position with caustic alkali and an alkali metal disulfide in the presence of an alkali metal sulfide.

20. A benzene compound having at least one member of the group consisting of hydroxy and alkali metal oxy groups directly connected to nuclear carbon atoms and at least two similar members of the group consisting of mercaptan and alkali metal mercaptide groups directly connected to nuclear carbon atoms.

21. In the process of preparing a hydroxy naphthyl mercapto compound, the step which comprises heating b-naphthol with caustic alkali, an alkali metal sulfide, and an alkali metal disulfide at superatmospheric temperature until reaction is complete, dissolving the reaction products in water, acidifying the solution, separating the solids from the acidified solution, reducing the solids in hot glacial acetic acid, and then separating the hydroxy naphthyl mercapto compound from the resulting solution.

22. In the process of preparing a dimercapto phenol, the step which comprises reacting one molecular proportion of phenol with two molecular proportions of an alkali metal disulfide and a caustic alkali at superatmospheric temperatures.

KEITH WILLIAM PALMER.

CERTIFICATE OF CORRECTION.

Patent No. 2,004,728. June 11, 1935.

KEITH WILLIAM PALMER.

It is hereby certified that error appears in the printed specification of the above numbered patent requiring correction as follows: Page 1, first column, line 33, for "orth-" read ortho-; and page 3, second column, line 7, claim 19, strike out the word "or"; and that the said Letters Patent should be read with these corrections therein that the same may conform to the record of the case in the Patent Office.

Signed and sealed this 16th day of July, A. D. 1935.

Leslie Frazer (Seal) Acting Commissioner of Patents.